Feb. 27, 1934.  T. C. McCONKEY  1,948,529
BRAKE GEAR SUPPORT
Filed July 10, 1930

Thomas Clarkson McConkey
Inventor
By
Attorney.

Patented Feb. 27, 1934

1,948,529

UNITED STATES PATENT OFFICE 1,948,529

BRAKE GEAR SUPPORT

Thomas Clarkson McConkey, Montreal, Quebec, Canada, assignor to Chicago Railway Equipment Company, Chicago, Ill.

Application July 10, 1930. Serial No. 467,099

8 Claims. (Cl. 188—210)

This invention relates to railway trucks, and particularly to providing means to support the brake beams mounted on such trucks.

The object of the invention is to provide an improved form of brake beam support. A further object is to provide a brake beam support of simple inexpensive and efficient construction. A further object is to provide a brake beam support readily attachable to the spring plank of the truck and eliminating attachments to or perforations in the spring plank of the truck.

Spring brake beam supports have been in use for many years, but they have all hitherto required brackets or stops riveted to the spring plank of the truck, or they have been secured to the spring plank by bolts or pins, or the spring plank has been perforated to provide for the insertion of the support therethrough, whereas in this invention the support is readily attached to the spring plank by hooking the spring hook of the support over the upright flange of the spring plank, without any work on the latter and the support is just as readily removable.

The invention consists of a strip of spring metal having an extended supporting portion, a grooved bend, a flat portion adapted to rest on the spring plank flange and an outwardly hooked end.

Figure 1:
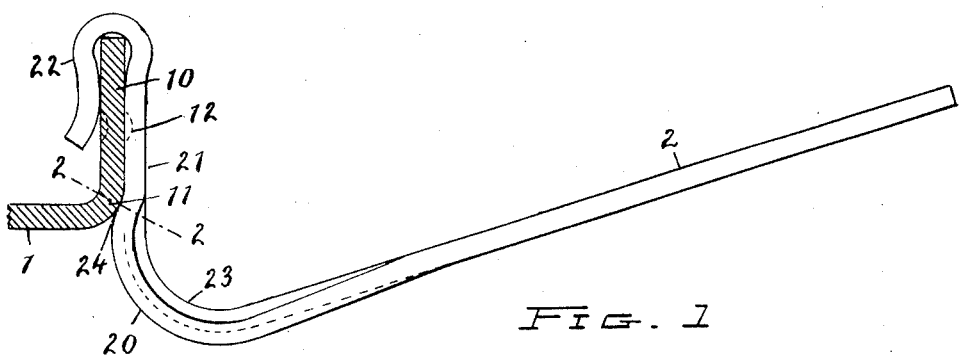
Figure 2:
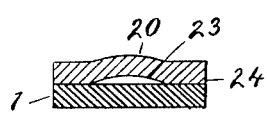

Reference should be made to the accompanying drawing in which Figure 1, is a side view of the support showing the spring plank in section. Figure 2, is a cross section on the line 2—2 of Figure 1, Figure 3 is a plan view.

The form of the support is as follows:—

The spring strip has the outwardly inclined portion 2, which extends a suitable length to project beyond the brake beam which it supports, the arcuate portion 20 is arched transversely as indicated at 23, the flat portion 21 is approximately the length of the flange 10 of the spring plank, the hook 22 which is formed by an outwardly bend, is bent to grip the flange 10 securely. The arcuate portion 20 at its outer edges 24 underlies a portion 11 of the spring plank and contacts with it, as shown by the cross section 2—2 of the Figure 2, and thereby provides a means of locking the support to the spring plank when in operative position and prevents vertical displacement.

Figure 3:
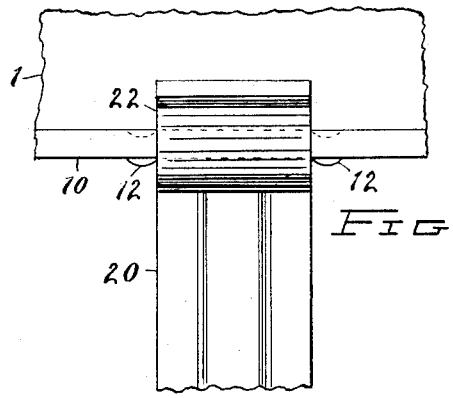

The support may be secured from lateral movement on the flange 10 of the spring plank, by means of beads 12 or other projections from the flange 10 at both sides of the support as shown in Figure 3.

With this construction a brake beam support is provided which is cheap to manufacture, readily and easily mounted in position on the spring plank flange, and removable without difficulty.

When the support is applied to the spring plank the hook 22 is applied over the spring plank flange and the hook 22 must be driven down until bend 20 reaches its contact with the bend 11. By means of this interlocking of the bends the support is secured from vertical displacement.

The device as above described provides, a brake beam support of efficient and durable design adapted to replace the elaborate and expensive forms and adjustments which have hitherto been employed for that purpose.

What I claim is:—

1. In a brake beam support, the combination of an upwardly flanged spring plank with a spring having an extended bearing portion, an upward bend thereon with a flat portion for engaging the outside of the spring plank flange and terminating in an outwardly hooked end receiving said flange, and means to prevent displacement when in operative position, and projecting beads in the flange on each side of the support.

2. A brake beam guard, guide or support device comprising an inverted U-shaped jaw the legs of which are adapted to tightly grip the opposite sides of an upright flange on a truck part and a portion of one of said legs is disposed to tightly engage a downwardly facing surface of said truck part to prevent any relative vertical movement of said jaw and truck part, there being an arm extending outwardly from said jaw to underlie a brake beam adjacent to said truck part.

3. A brake beam guard, guide or support device comprising a continuous bar of metal comprising an arm disposed to underlie a brake beam and to extend towards the upturned flange of a spring plank, the end of said arm having an upturned leg, to engage the outer face of said flange, and an inwardly and downturned leg extending therefrom to engage the top and inner face of said flange, there being a relatively slight projection at the lower part of said upturned leg to engage said spring plank and prevent upward movement of the device relative thereto during normal operations.

4. In combination, a car truck channel spring plank provided with an upstanding flange, and a brake beam guard, guide or support device of yielding material terminating in a hook which clamps over said flange, said device being applied from above to said flange and the lowermost part of said hook having a projecting element engaging the bottom of the outer corner of said spring plank to hold the device against accidental upward movement thereon, said device being removable from the spring plank by distortion to disengage said projecting element therefrom followed by upward movement of the device.

5. In combination, a truck spring plank having a bottom web and a flange, and a brake beam guard, guide or support device carried by said plank and comprising a beam engaging part and a leg projecting angularly therefrom and resting against the outer surface of said flange, there being an element extending from said leg over said flange and yieldingly gripping the inner surface thereof above said bottom web and a projection on said leg cooperating with the outer corner of said plank to resist upward movement of said device.

6. In combination, a truck member having an upstanding flange, and a brake beam guard, guide or support device carried by said member and applicable thereto from above and without perforation of said member and comprising a beam engaging part, a leg projecting upwardly therefrom and abutting the outer surface of said flange, and an element extending from said leg over said flange and downwardly and abutting the inner surface thereof, said leg and element yieldingly gripping the sides of said flange and engaging upward and downwardly facing surfaces of said member to maintain their assembly.

7. A railway truck brake gear guard or support device comprising an inverted U-shaped hook with downwardly projecting legs adapted to yieldingly grip the opposite sides of an upright flange on a truck part, one of said legs being provided with an offset intermediate its ends positioned so as to engage a downwardly facing surface of said truck part to prevent relative vertical movement of said leg and truck part, there being a member projecting from said hook to underlie a brake gear adjacent to said truck part.

8. In combination, a car truck channel-shape spring plank including an upstanding flange, and a brake gear guard or support device including a hook of yielding material clamped over said flange, said device being applied from above to said flange and the lower part of said hook having a projecting element engaging the bottom of the outer corner of said spring plank to hold the device against accidental upward movement thereon, said device being removable from the spring plank by distortion to disengage said projecting element therefrom followed by upward movement of the device.

THOMAS CLARKSON McCONKEY.